United States Patent [19]
Quaglia et al.

[11] Patent Number: 5,329,571
[45] Date of Patent: Jul. 12, 1994

[54] REACTOR CORE FOR A BOILING WATER NUCLEAR REACTOR

[75] Inventors: Patricia Quaglia; Bertil Schölin, both of Västerås, Sweden

[73] Assignee: ABB Atom AB, Västerås, Sweden

[21] Appl. No.: 65,747

[22] Filed: May 12, 1993

[30] Foreign Application Priority Data

May 25, 1992 [SE] Sweden ................... 9201638

[51] Int. Cl.$^5$ ........................................... G21C 3/322
[52] U.S. Cl. ..................................... 376/352; 376/444
[58] Field of Search ................ 376/352, 443, 444, 448

[56] References Cited

U.S. PATENT DOCUMENTS

| | | | |
|---|---|---|---|
| 4,678,631 | 7/1987 | Taleyarkhan | 376/444 |
| 4,803,044 | 2/1989 | Patterson | 376/444 |
| 5,230,858 | 7/1993 | Matzner et al. | 376/444 |

Primary Examiner—Daniel D. Wasil
Attorney, Agent, or Firm—Watson, Cole, Grindle & Watson

[57] ABSTRACT

A reactor core for a boiling water nuclear reactor comprises a plurality of vertical fuel assemblies (40a, 42, 44), each one containing a plurality of fuel rods (10), which are arranged between a bottom-tie plate (11) and a top-tie plate (12) in a surrounding vertical casing (6) and which extend through a number of spacers (13, 13a-f) which are arranged in spaced relationship in the vertical direction and which together with the bottom-tie plate and the top-tie plate retain the fuel rods in spaced relationship in the lateral direction. Each fuel assembly is designed with an inlet (3) for water for conducting water in through the bottom-tie plate, through the space between the fuel rods in the vertical casing, and out through the top-tie plate. Some of the fuel assemblies, at a level located above the center of the active length of the fuel rods and below at least two of the uppermost spacers (13a, 13b), are provided with outlet holes (41, 43, 44) for release of water from the space between the fuel rods to vertically directed spaces (32, 37a, 37b), arranged outside the fuel assembly and traversed by water, or to a vertically directed channel (45), arranged internally in the fuel assembly and traversed by water.

20 Claims, 6 Drawing Sheets

REACTOR CORE FOR A BOILING WATER NUCLEAR REACTOR

The present invention relates to a reactor core for a nuclear reactor of boiling water type with a plurality of vertical fuel assemblies, each one containing a plurality of fuel rods, which are arranged between a bottom-tie plate and a top-tie plate in a surrounding vertical casing and which extend through a number of spacers which are arranged in spaced relationship in the vertical direction and which together with the bottom-tie plate and the top-tie plate retain the fuel rods in spaced relationship in the lateral direction. Each fuel assembly is formed with an inlet for water for conducting water in through the bottom-tie plate, through the space between the fuel rods in the vertical casing, and out through the top-tie plate. Further, each fuel assembly is arranged with interspaces with respect to adjacent fuel assembly and possibly with a channel arranged internally in the fuel assembly for conducting water through the interspaces and through the internal channel (if any) in a vertical direction from below and upwards through the core.

In operation of a nuclear reactor of boiling water type with a core containing several fuel assemblies of the above-mentioned kind, there may be a risk of so-called dryout occurring, that is to say that the water film which is present on the surface of each fuel rod disappears or is broken down in limited regions, which locally leads to a considerably deteriorated heat transfer between the fuel rod and the water conducted through the fuel assembly, resulting in a greatly increased wall temperature of the fuel rod. The increased wall temperature may lead to damage with serious consequences arising on the fuel rod.

The present invention is based on the realization that the risk of the occurrence of the unfavourable events described above, caused by the occurrence of dryout, can be eliminated or considerably counteracted by providing outlet holes for water at a certain level in some of the fuel assemblies. In comparison with a fuel assembly without outlet holes, a fuel assembly with outlet holes, inserted into a core with equal pressure drop, provides a greater flow up to the level of the hole and a lower flow above the level of the hole. The greater flow in the lower part of the fuel assembly gives a lower steam content up to the level of the hole, which together with the lower flow rate above the level of the hole gives improved dryout conditions in the fuel assembly. The lower flow rate above the level of the hole contributes to the improvement in that the water film on each fuel assembly grows in thickness as a consequence of reduced friction between the water film and the steam-water mixture flowing outside the fuel rods.

What characterizes the present invention is, more particularly, that outlet holes for water for release of water from the space between the fuel rods to the interspaces between the fuel assemblies and/or to any internal channels in the fuel assemblies are arranged in the casing at a level positioned above the centre of the active length of the fuel rods and below at least the two uppermost spacers. By the active length of a fuel rods is meant in this application that axial part of the fuel rod which contains nuclear fuel material.

The total area of the holes suitably constitutes 5–80% and preferably 20–40% of the flow area in the fuel assembly. By flow area in a fuel assembly is meant in this application that area in a horizontal section in the fuel assembly which is not occupied by fuel rods.

The percentage of fuel assemblies which are arranged with outlet holes for water suitably constitutes 10–75% and preferably 25–55% of the total number of fuel assemblies in the core.

When the burnup in a reactor of the above-mentioned kind has progressed so far that the smallest acceptable core reactivity margin has been attained, a partial recharge is carried out. By balancing in a suitable way how much fuel that is to be replaced as well as the enrichment of the replacement fuel, an excess reactivity is obtained which permits a certain energy output until the next refuelling. During the partial recharge, one-fifth of the fuel, for example, can be replaced every operating year (or any other suitable operating cycle) as from the end of the second operating year. This means that the fuel in the exemplified case remains in the core for five years during steady state, but that part of the fuel which is replaced during the initial stage is used for a shorter period of time. Casings with outlet holes for water according to the present invention are intended to be used in fuel assemblies with fresh fuel during the first or the first two operating cycles. Then the casing in each fuel assembly is replaced by a casing without outlet holes. The reason is that the risk of dryout is greatest when the fuel is fresh and has a high reactivity and hence high power.

The invention will be explained in greater detail by describing an embodiment with reference to the accompanying drawings, wherein.

Figure 1:
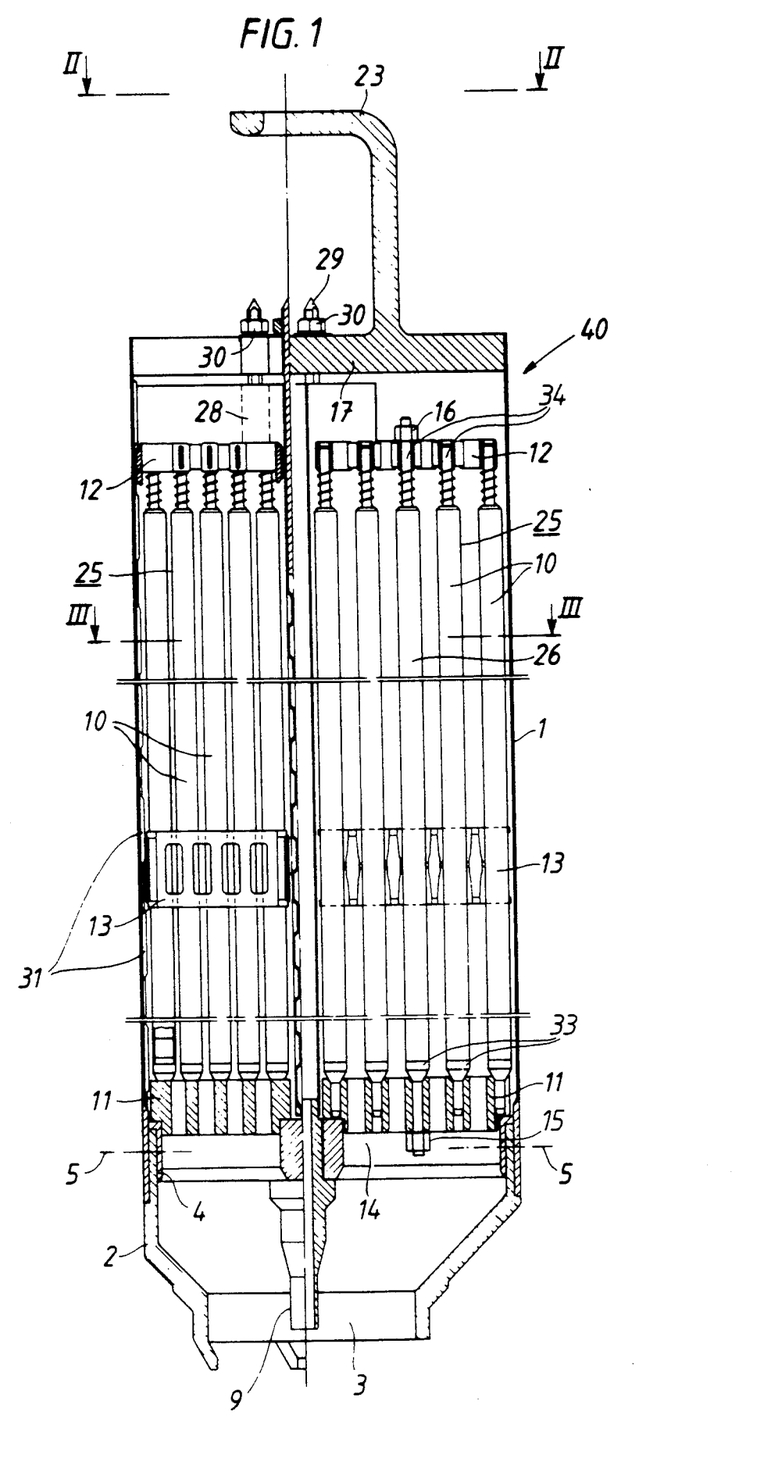
FIG. 1 shows in vertical section through the line I—I in FIG. 2 a fuel assembly suitable for the application of the invention, composed of four fuel assemblies according to the invention.
Figure 2:
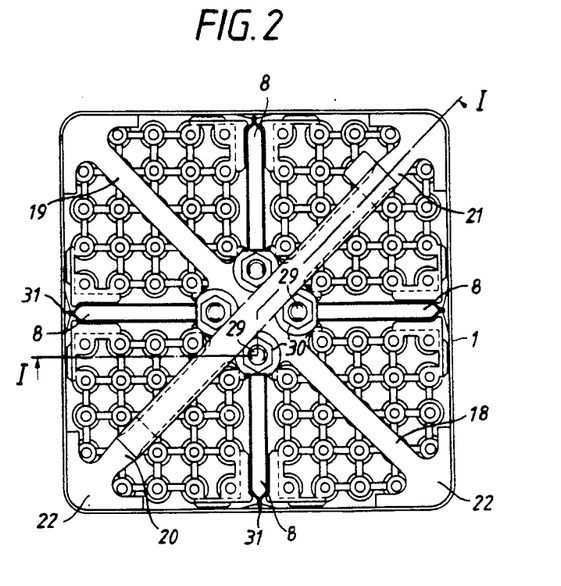
FIG. 2 shows the same composed fuel assembly in a view perpendicular to a horizontal plane through the line II—II in FIG. 1.
Figure 3:
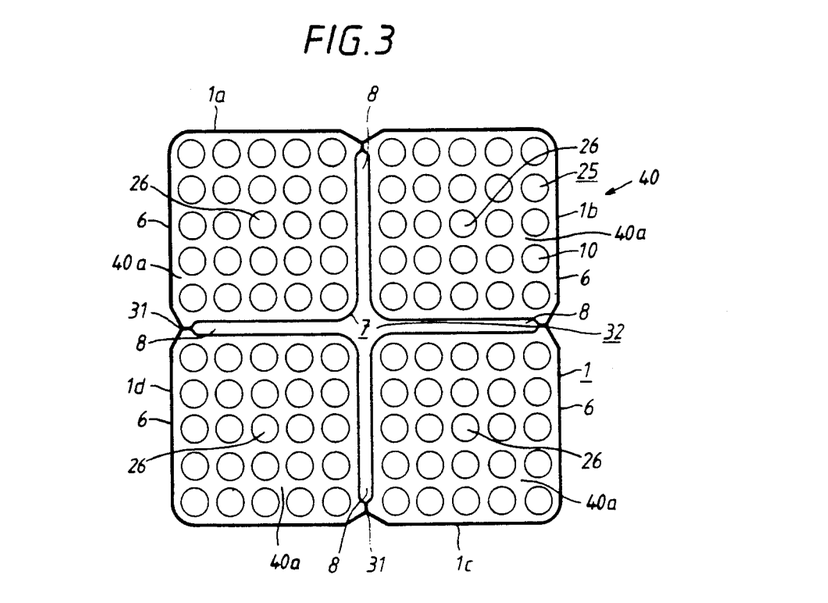
FIG. 3 shows a horizontal section through the line III—III in FIG. 1.

In FIGS. 1–3, 1 designates a fuel channel of substantially square cross section. The fuel channel surrounds with no mentionable play an upper, square portion of a bottom part 2 with a circular, downwardly facing inlet opening 3 for cooling water and moderator water. The bottom part 2 supports, in addition to the fuel channel 1, a supporting plate 4. At its lowest part the fuel channel 1 has a relatively thick wall portion which is fixed to the bottom part 2 and the supporting plate 4 by means of a plurality of horizontal bolts, indicated by means of dash-dotted lines 5. The fuel channel 1 is divided, by means of a hollow support member 7 of cruciform cross section, into four vertical tubular parts 6, hereinafter referred to as casings, with at least substantially square cross section. The support member 7 is welded to the four walls 1a, 1b, 1c and 1d of the fuel channel 1 and has four hollow wings 8. The cruciform space formed from the support member is designated 32 and is connected at its lowest part to an inlet tube 9 for moderator water. Each casing 6 comprises a bundle 25 containing twenty-five fuel rods 10. The rods are arranged in a symmetrical lattice in five rows each containing five rods. Each rod is included in two rows perpendicular to each other. Each bundle is arranged with a bottom-tie plate 11, a top-tie plate 12 and a plurality of spacers 13. A fuel rod bundle 25 with a bottom-tie plate 11, a top-tie plate 12, a spacer 13 and a casing 6 forms a unit which in this application is referred to as fuel assembly and is designated 40a, whereas the device illustrated in FIGS. 1–3 comprising four such fuel assemblies is referred to as a composed fuel assembly and is designated 40. In the composed fuel assembly 40 each fuel assembly 40a is arranged with interspaces 8 with respect to adjacent fuel assemblies 40a in that the cruciform space 32 extends through the composed fuel assembly in a vertical direction. The four bottom-tie plates 11 are supported in the composed fuel assembly by the supporting plate 4 and are each partially inserted into a respective square hole 14 in this plate. In each fuel assembly at least one of the fuel rods is designed with relatively long, threaded end plugs 33 and 34 of solid cladding material, the lower end plug 33 being passed through the bottom-tie plate 11 and provided with a nut 15, the upper end plug 34 being passed through the top-tie plate 12 and provided with a nut 16. In the embodiment shown, the centre rod 26 is designed in this way. This rod also serves as a spacer holder rod. An upper end portion of the fuel channel 1 surrounds a cruciform lifting plate 17 with four horizontal arms 18, 19, 20 and 21, which extend from a common central portion. At the outer end each arm has an arrow-head-like portion 22 which, in respective corners of the fuel channel 1, makes contact with the inner wall surface of the fuel channel 1. A lifting handle 23 is fixed to the arms 20 and 21. The lifting plate 17 and the handle 23 together form a lifting member of steel cast in one piece. The lifting plate 17 is fixed to the support member 7 by inserting each of four vertical bars 28 into a respective wing 8 of the support member 7 and welding them thereto, At the top each bar 28 has a vertical, bolt-like portion 29 which is passed with a play through a corresponding hole in the mid-portion of the lifting plate 17 and provided with a nut 30. As will be clear from the figures, the fuel channel 1 is provided with indentations 31, intermittently arranged in the longitudinal direction, to which the support member 7 is welded.

Figure 4:
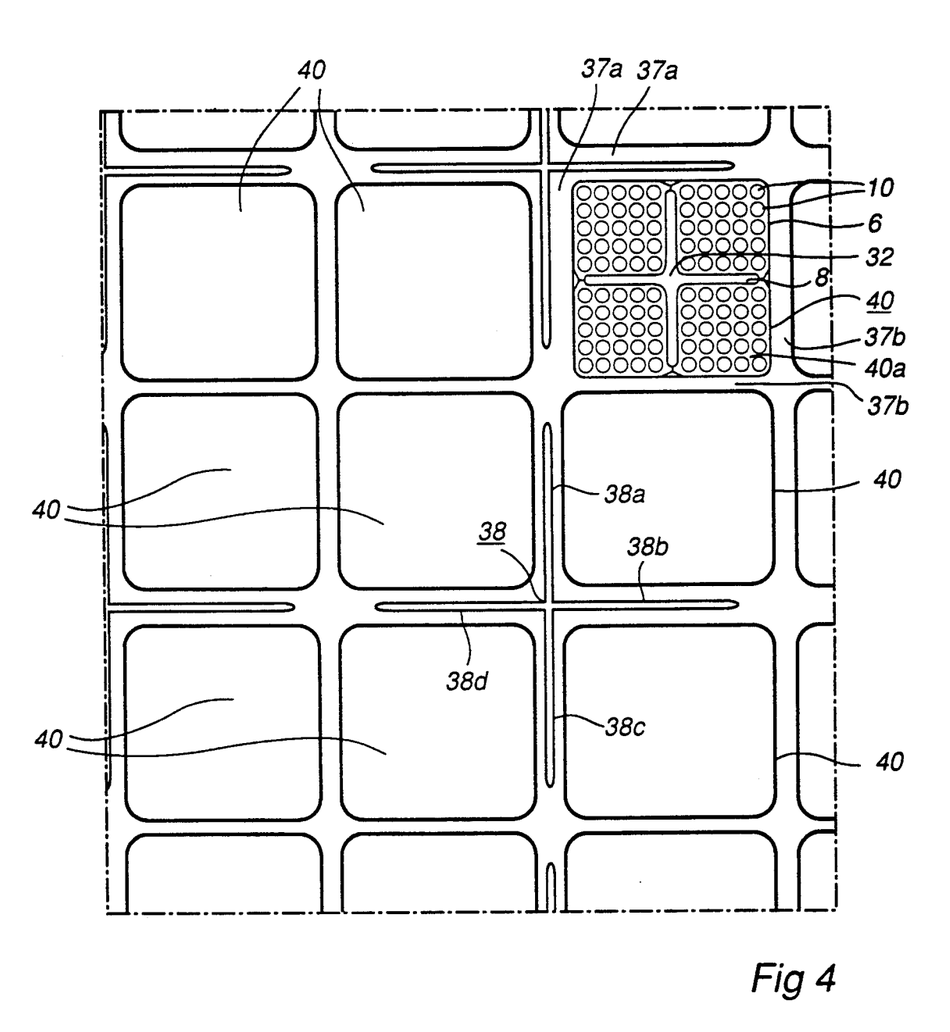
FIG. 4 shows a horizontal section of part of a reactor core.

FIG. 4 shows a small part of a reactor core. The section comprises nine whole composed fuel assemblies 40 of the kind illustrated in FIGS. 1–3. Of the fuel assemblies only one is shown in detail, the other ones only as empty squares. The spaces between the fuel rods 10 within each fuel assembly 40a is traversed by water as is the cruciform space 32 in the composed fuel assembly 40. The interspaces in the form of gaps 37a and 37b between the fuel assemblies 40 are also traversed by water. Those gaps 37a into which control rods 38 can be inserted are wider than those gaps 37b into which no control rods can be inserted. The control rods 38 have blades 38a, 38b, 38c and 38d which form a right-angled cross.

Figures 5, 6, 7:
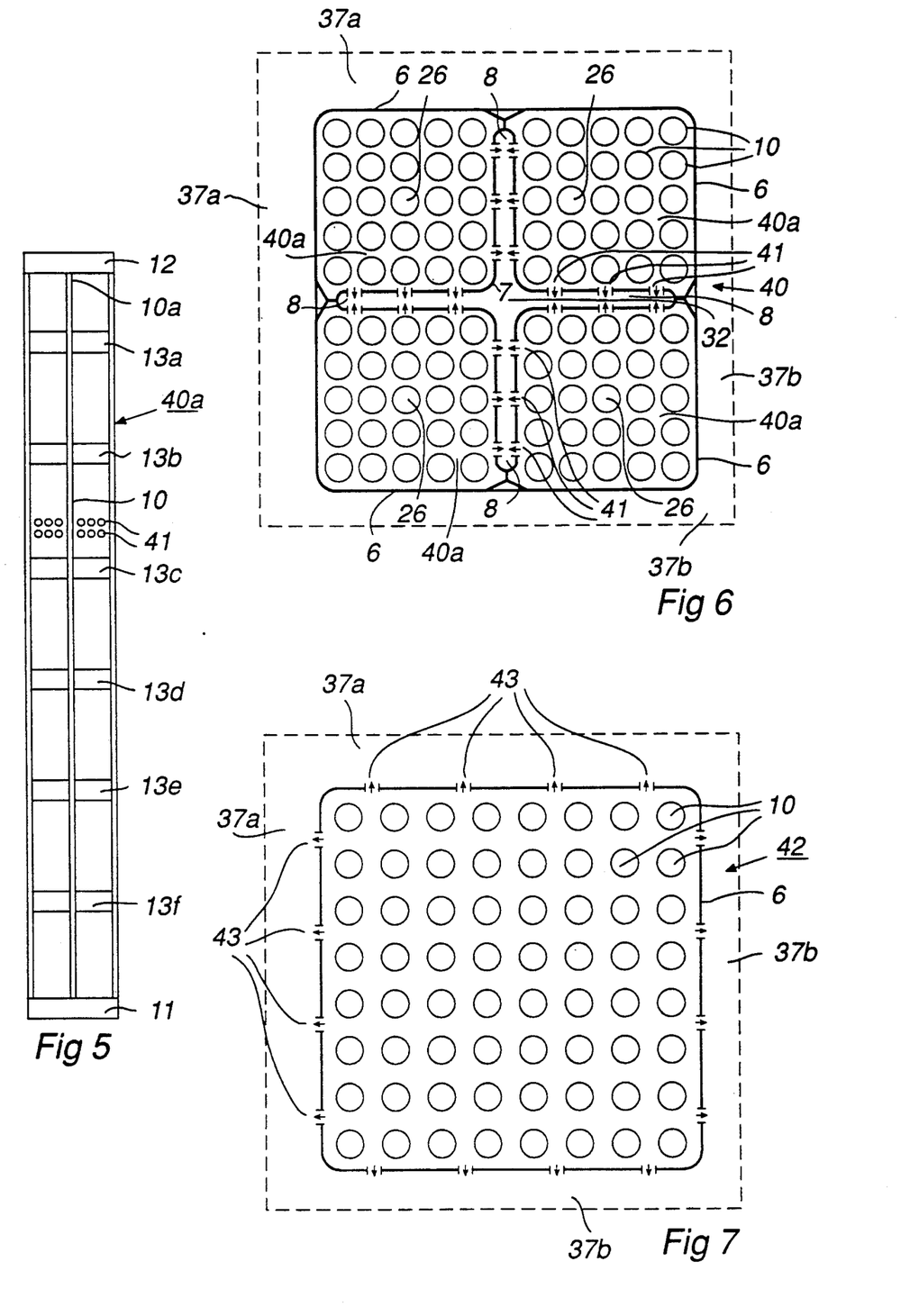
FIG. 5 shows a schematic picture of only the vertical casing of a fuel assembly according to the invention with all the spacers in the fuel assembly but with only one of the fuel rods to make the picture clear.
FIGS. 6 and 6a show a horizontal section through the composed fuel assembly according to FIG. 1 at a level where outlet holes for water from the fuel assembly are arranged.
FIGS. 7, 8 and 8a show horizontal sections of fuel assemblies of a different kind at a level where outlet holes for water are arranged.
Figure 6A:
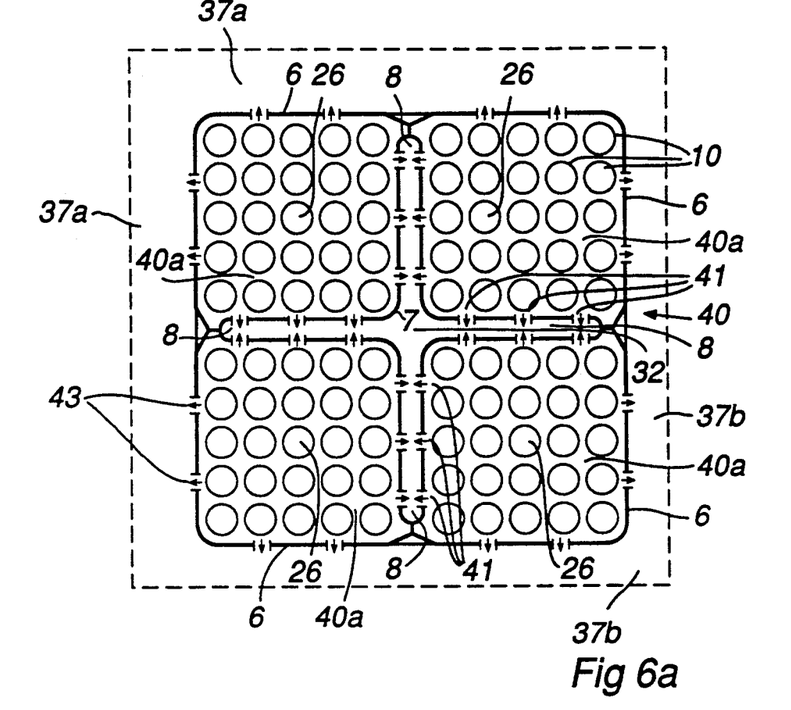

The fuel assembly 40a schematically shown in FIG. 5 has, in the exemplified case, six spacers 13a–f. Each fuel rod 10, of which only one is shown in the figure, contains between the two end plugs 33 and 34 (FIG. 1) a large number of pellets, stacked one above the other, of uranium dioxide enriched with U 235. At the top there is a plenum 10a filled with helium. This plenum without nuclear fuel material is thus not included in the active length of the fuel rod. On two sides the fuel assembly is provided with outlet holes 41 for releasing water. The outlet holes are located at a level above the centre of the active length of the fuel rods and below the two uppermost spacers 13a and 13b. FIG. 5 does not show the front side of the casing 6 but only the positions of the outlet holes thereon. According to the embodiment of the present invention illustrated in FIG. 6, four fuel assemblies 40a of the kind shown in FIG. 5 are arranged to form a composed fuel assembly 40 of the kind described with reference to FIGS. 1–3. The outlet holes 41 for water for release of water from the four fuel assemblies 40a to the space 32 in the composed fuel assembly 40 are arranged on those sides of the casing 6 facing the space 32. Outlet holes could also be arranged in those sides of the casing 6 facing the water gaps 37a and 37b (FIG. 4). The water gaps 37a and 37b shown in FIG. 4 are in FIG. 6, as well as in FIGS. 7 and 8, marked by dashed lines. In the exemplified case, 40% of the total number of fuel assemblies in the core are arranged with outlet holes for water of the kind described.

The fuel assembly 42 illustrated in FIG. 7 corresponds to the composed fuel assembly 40 shown in FIGS. 3 and 6 and each one of the composed fuel assemblies 40 in the reactor core according to FIG. 4 can be replaced by such a fuel assembly 42. The fuel assembly 42 comprises $8 \times 8$ fuel rods and has no cruciform internal space traversed by water. According to the present invention, outlet holes 43 for water are arranged on all side of the casing 6 which are facing the water gaps 37a and 37b. As in the case illustrated in FIGS. 5 and 6, the outlet holes are arranged at a level above the centre of the active length of the fuel rods and below the two uppermost spacers.

Figure 8:
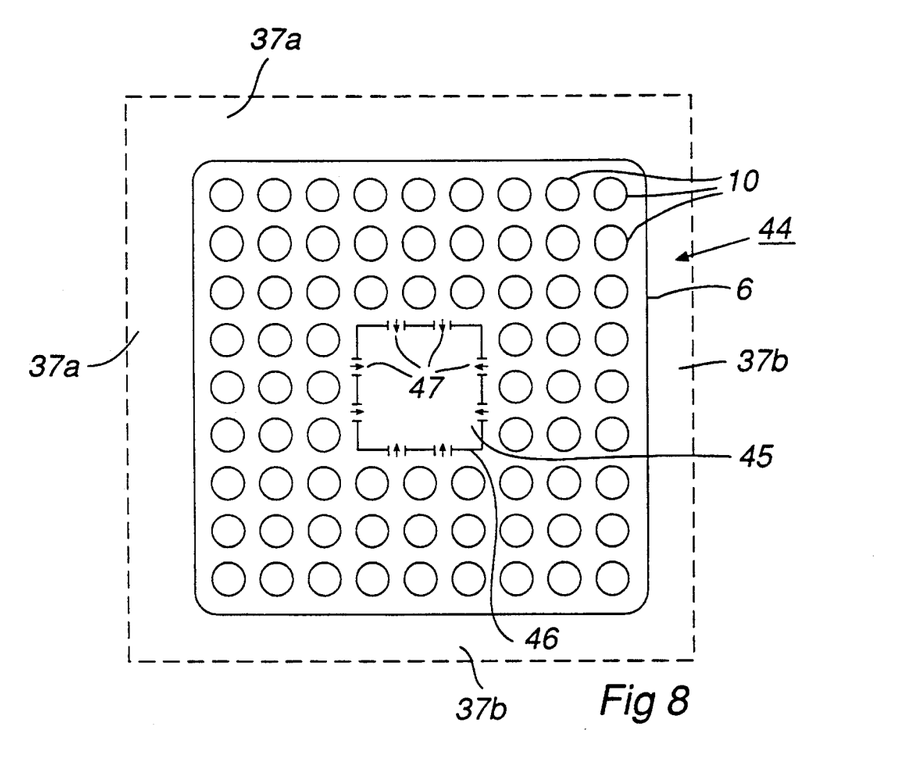
Figure 8A:
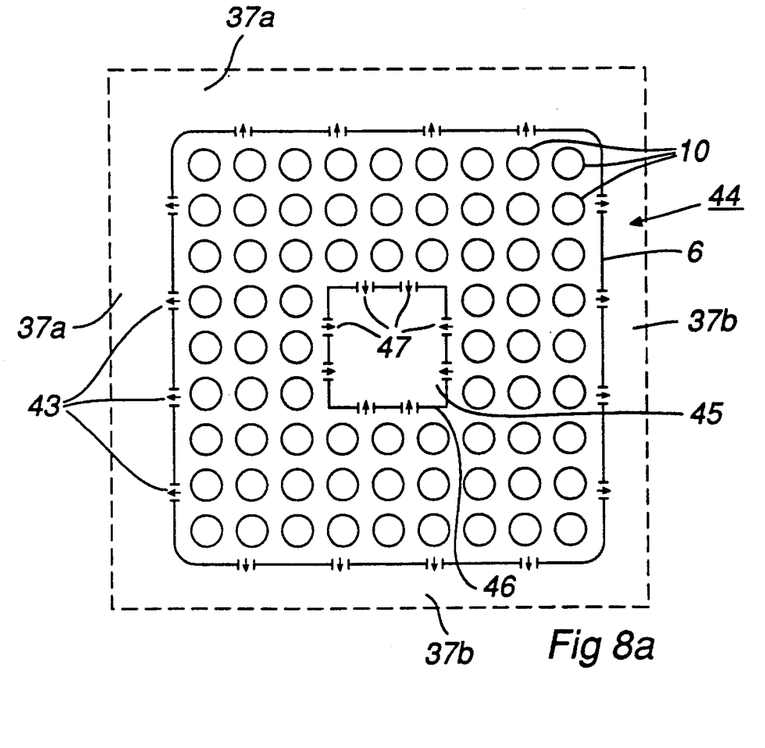

The fuel assembly 44 illustrated in FIG. 8, like the fuel assembly illustrated in FIG. 7, corresponds to the composed fuel assembly 40 shown in FIGS. 3 and 6 and can replace each one of the composed fuel assemblies 40 in the reactor core according to FIG. 4. The fuel assembly 44 is provided with an internally arranged vertical channel 45, through which water is conducted in a vertical direction from below and upwards through the assembly. The wall of the channel is designated 46. The fuel assembly 44 comprises $9 \times 9$ fuel rods, with $3 \times 3$ removed for the arrangement of the channel 45 that is 72 fuel rods in all. According to the present invention, outlet holes 47 for water are arranged in the walls of the vertical channel for releasing water from the space between the fuel rods to the channel. The outlet holes 47 are located at the same level as the outlet holes 41 and 43 in the examples illustrated in FIGS. 6 and 7. Outlet holes could also be arranged in those sides of the casing facing the water gaps 37a and 37b.

In the cases exemplified in FIGS. 5, 6, 7 and 8, the total area of the outlet holes in each one of the fuel assemblies constitutes 30% of the flow area in the respective fuel assembly (40a, 42, 44).

We claim:

1. A reactor core for a boiling water nuclear reactor with a plurality of vertical fuel assemblies (40, 42, 44), each fuel assembly containing
   a bottom-tie plate (11),
   a top-tie plate (12), a plurality of fuel rods (10) arranged between the bottom-tie plate and the top-tie plate,
a vertical casing (6) surrounding the fuel rods,
a number of spacers (13, 13a–f) for retaining the fuel rods in a spaced relationship,
an inlet (3) for conducting water in through the bottom-tie plate through the space between the fuel rods and out through the top-tie plate, and gaps (37a,37b) between the fuel assemblies, said gaps being traversed with water in a vertical direction from below and upwards through the core,
wherein in some of the fuel assemblies outlet holes (43) are arranged in the casing (6) for release of water from the space between the fuel rods to the gaps between the fuel assemblies, and said outlet holes (43) are arranged at a level located above the centre of the active length of the fuel rods so that a greater flowrate in the space between the fuel rods is achieved below the level of the holes and a lower flowrate is achieved in the space between the fuel rods above the level of the holes.

2. A reactor core according to claim 1, wherein said outlet holes (43) are arranged at a level below the two uppermost spacers (13a, 13b).

3. A reactor core according to claim 2, wherein the total area of the outlet holes (43) constitutes 5–80% of the flow area in the fuel assembly.

4. A reactor core according to claim 2, wherein the total area of the outlet holes (43) constitutes 20–40% of the flow area in the fuel assembly.

5. A reactor core according to claim 2, wherein the percentage of the fuel assemblies (40, 42, 44) which are arranged with outlet holes for water constitute 10–75% of the total number of fuel assemblies in the core.

6. A reactor core for a boiling water nuclear reactor with a plurality of vertical fuel assemblies (40), each fuel assembly containing
a bottom-tie plate (11),
a top-tie plate (12),
a plurality of fuel rods (10) arranged between the bottom-tie plate and the top-tie plate,
a vertical casing (6) surrounding the fuel rods,
a number of spacers (13, 13a–f) for retaining the fuel rods in a spaced relationship,
an inlet (3) for conducting water in through the bottom-tie plate through the space between the fuel rods and out through the top-tie plate,
a hollow support member (7) of cruciform cross section forming
a cruciform space (32), for conducting water in a vertical direction from below and upwards through the fuel assembly, and gaps (37a,37b) between the fuel assemblies, said gaps being traversed with water in a vertical direction from below and upwards through the core,
wherein in some of the fuel assemblies outlet holes (43,41) are arranged in the casing (6) and in the support member (7) for release of water from the space between the fuel rods to the gaps between the fuel assemblies and to the cruciform space (32), and said outlet holes (43,41) are arranged at a level located above the centre of the active length of the fuel rods so that a greater flowrate in the space between the fuel rods in achieved below the level of the holes and a lower flowrate is achieved in the space between the fuel rods above the level of the holes.

7. A reactor core according to claim 6, wherein said outlet holes (43,41) are arranged at a level below the two uppermost spacers (13a, 13b).

8. A reactor core according to claim 7, wherein the total area of the outlet holes (43,41) constitutes 5–80% of the flow area in the fuel assembly.

9. A reactor core according to claim 7, wherein the total area of the outlet holes (43,41) constitutes 20–40% of the flow area in the fuel assembly.

10. A reactor core according to claim 7, characterized in that the percentage of the fuel assemblies (40) which are arranged with outlet holes for water constitute 10–75% of the total number of fuel assemblies in the core.

11. A reactor core for a boiling water nuclear reactor with a plurality of vertical fuel assemblies (40), each fuel assembly containing
a bottom-tie plate (11),
a top-tie plate (12),
a plurality of fuel rods (10) arranged between the bottom-tie plate and the top-tie plate,
a vertical casing (6) surrounding the fuel rods,
a number of spacers (13, 13a–f) for retaining the fuel rods in a spaced relationship,
an inlet (3) for conducting water in through the bottom-tie plate through the space between the fuel rods and out through the top-tie plate,
a hollow support member (7) of cruciform cross section forming
a cruciform space (32), for conducting water in a vertical direction from below and upwards through the fuel assembly, and gaps (37a,37b) between the fuel assemblies, said gaps being traversed with water in a vertical direction from below and upwards through the core,
wherein in some of the fuel assemblies outlet holes (41) are arranged in the hollow support member (7) for release of water from the space between the fuel rods to the cruciform space (32), and said outlet holes (41) are arranged at a level located above the centre of the active length of the fuel rods so that a greater flowrate in the space between the fuel rods is achieved below the level of the holes and a lower flowrate is achieved in the space between the final fuel rods above the level of the holes.

12. A reactor core according to claim 1, wherein said outlet holes (41) are arranged at a level below the two uppermost spacers (13a, 13b).

13. A reactor core according to claim 12, wherein the total area of the outlet holes (41) constitutes 5–80% of the flow area in the fuel assembly.

14. A reactor core according to claim 12, wherein the total area of the outlet holes (41) constitutes 20–40% of the flow area in the fuel assembly.

15. A reactor core according to claim 12, wherein the percentage of the fuel assemblies (40) which are arranged with outlet holes for water constitute 10–75% of the total number of fuel assemblies in the core.

16. A reactor core for a boiling water nuclear reactor with a plurality of vertical fuel assemblies (44), each fuel assembly containing
a bottom-tie plate (11),
a top-tie plate (12),
a plurality of fuel rods (10) arranged between the bottom-tie plate and the top-tie plate,
a vertical casing (6) surrounding the fuel rods,
a number of spacers (13, 13a–f) for retaining the fuel rods in a spaced relationship,
an inlet (3) for conducting water in through the bottom-tie plate through the space between the fuel rods and out through the top-tie plate, a channel (45) arranged internally in the fuel assembly for conducting water in a vertical direction from below and upwards through the fuel assembly, a wall (46) surrounding the channel, and gaps (37a,37b) between the fuel assemblies, said gaps being traversed with water in a vertical direction from below and upwards through the core, wherein in some of the fuel assemblies outlet holes (43,47) are arranged in the casing (6) and in the wall (46) for release of water from the space between the fuel rods to the gaps between the fuel assemblies and to the channel, and said outlet holes (43,47) are arranged at a level located above the centre of the active length of the fuel rods so that a greater flowrate in the space between the fuel rods is achieved below the level of the holes and a lower flowrate is achieved in the space between the fuel rods above the level of the holes.

17. A reactor core according to claim 16, characterized in that said outlet holes (43,47) are arranged at a level below the two uppermost spacers (13a, 13b).

18. A reactor core according to claim 17, characterized in that the total area of the outlet holes (43,47) constitutes 5–80% of the flow area in the fuel assembly.

19. A reactor core according to claim 17, characterized in that the total area of the outlet holes (43,47) constitutes 20–40% of the flow area in the fuel assembly.

20. A reactor core according to claim 17, characterized in that the percentage of the fuel assemblies (44) which are arranged with outlet holes for water constitute 10–75% of the total number of fuel assemblies in the core.

* * * * *